United States Patent
Dehez et al.

(10) Patent No.: US 10,461,596 B2
(45) Date of Patent: Oct. 29, 2019

(54) WINDING FOR A ROTATING ELECTRICAL MACHINE AND METHOD FOR DESIGNING SUCH A WINDING

(71) Applicant: Universite Catholique de Louvain, Louvain-la-Neuve (BE)

(72) Inventors: Bruno Dehez, Liernu (BE); François Baudart, Bourlers (BE)

(73) Assignee: Universtie Catholique De Louvain, Louvain-la-Neuve (BE)

( * ) Notice: Subject to any disclaimer, the term of this patent is extended or adjusted under 35 U.S.C. 154(b) by 607 days.

(21) Appl. No.: 14/900,055

(22) PCT Filed: Jun. 27, 2014

(86) PCT No.: PCT/EP2014/063640
§ 371 (c)(1),
(2) Date: Dec. 18, 2015

(87) PCT Pub. No.: WO2014/207174
PCT Pub. Date: Dec. 31, 2014

(65) Prior Publication Data
US 2016/0164358 A1    Jun. 9, 2016

(30) Foreign Application Priority Data
Jun. 27, 2013  (EP) .................................. 13173946

(51) Int. Cl.
*H02K 3/26*   (2006.01)
*H02K 3/28*   (2006.01)

(52) U.S. Cl.
CPC ................. *H02K 3/26* (2013.01); *H02K 3/28* (2013.01)

(58) Field of Classification Search
CPC ........ H02K 3/26; H02K 3/28; H02K 2203/03; Y02E 10/725
(Continued)

(56) References Cited

U.S. PATENT DOCUMENTS 3,324,323 A * 6/1967 Henry-Baudot ......... H02K 3/26
                                                310/203
3,805,104 A * 4/1974 Margrain ................. H02K 3/26
                                                310/207

(Continued)

FOREIGN PATENT DOCUMENTS

| FR | 76288 | 9/1961 |
|----|-------|--------|
| FR | 2262880 | 9/1975 |
| JP | S50152201 | 12/1975 |

OTHER PUBLICATIONS

Dehez, et al., "Analysis and Comparison of Classical and Flex-PCB Slotless Windings in BLDC Motors," 15th International Conference on Electrical Machines and Systems (ICEMS), Oct. 2012, 6 pages.

(Continued)

*Primary Examiner* — Bernard Rojas
(74) *Attorney, Agent, or Firm* — Hanley, Flight and Zimmerman, LLC

(57) ABSTRACT

The invention provides a winding (40) for a rotating electrical machine (1) comprising a flexible PCB (45) having a plurality of conductors (60) on a first surface and a plurality of conductors (60) on a second surface, said conductors having a shape optimizing the performance of the machine, and a method for designing such a winding.

17 Claims, 12 Drawing Sheets

(58) Field of Classification Search
USPC .......................................... 310/179, 194, 208
See application file for complete search history.

(56) References Cited

U.S. PATENT DOCUMENTS

| 3,944,857 | A | | 3/1976 | Faulhaber | |
|---|---|---|---|---|---|
| 6,111,329 | A | * | 8/2000 | Graham | H02K 3/26 |
| | | | | | 29/598 |
| 2009/0072651 | A1 | * | 3/2009 | Yan | H01F 5/003 |
| | | | | | 310/179 |
| 2014/0077831 | A1 | * | 3/2014 | Kordmann | H02K 41/031 |
| | | | | | 324/750.22 |

OTHER PUBLICATIONS

International Search Report, issued by the International Searching Authority in connection with International patent application No. PCT/EP2014/063640, dated Feb. 25, 2015, 3 pages.

International Preliminary Report on Patentability and Written Opinion, issued by the International Searching Authority in connection with International patent application No. PCT/EP2014/063640, dated Dec. 29, 2015, 7 pages.

European Patent Office, "Communication pursuant to Article 94(3) EPC," issued in connection with EP Patent application No. 14734122.6, dated Jul. 5, 2019, 8 pages.

* cited by examiner

WINDING FOR A ROTATING ELECTRICAL MACHINE AND METHOD FOR DESIGNING SUCH A WINDING

RELATED APPLICATIONS

This patent is a nationalization of International Patent Application PCT/EP2014/063640, which was filed Jun. 27, 2014 and titled "Winding for a Rotating Electrical Machine and Method for Designing Such a Winding", which claims priority to European Patent Application EP 13173946.8, which was filed on Jun. 27, 2013 and titled "Winding for a Rotating Electrical Machine and Method for Designing Such a Winding", both of which are hereby incorporated by reference in their entireties.

FIELD OF THE INVENTION

The invention relates to a winding for a rotating electrical machine, the machine comprising an inductor, an iron core, and an air gap in between, the winding comprising a flexible PCB having a plurality of conductors on a first surface and a plurality of conductors on a second surface of a substrate, said conductors being tracks printed on said PCB, a conductor of the first surface being connected through a via to a conductor of the second surface so as to form a turn, such that when rolled up one or more times, along the length, it is adapted for inserting into said air gap in an axial direction. The invention also relates to a method for designing such a winding.

DESCRIPTION OF PRIOR ART

Traditional windings made of copper wire have been known and used for producing electric motors such as Brushless DC electric motors (BLDC motors). Windings printed on flexible circuit board (Flex-PCB) have also been used for producing such motors, offering the opportunity to improve the performance of these BLDC motors since, compared with windings made from copper wire, they are easier to produce, and less expensive and give more flexibility in shape and design.

Document FR76288 discloses a planar DC motor, where the useful magnetic field of the magnets is axial, whose windings are printed on a rigid planar PCB with conductors on a first surface of the PCB, and circuits on the second surface of the PCB, connected through vias. This document discloses the use of windings with curved shape conductors. The use of windings with a curved shape in planar motors is well known to improve the performances of the machine. However, despite the fact that curved shape windings are well known in planar motors, these windings are not known as improving the performances of the Brushless DC electric motors (BLDC motors) where the useful magnetic field of the magnets is radial.

Documents US20090072651 and FR2262880 both disclose slotless windings for rotating electric machines and a manufacturing method thereof. These documents disclose the use of a flexible PCB, with conductors on a first surface of the PCB, and conductors on the second surface of the PCB, connected through vias. However, these document do not address the problem of optimizing the performance, are limited to windings whose conductors on each PCB surface are made of two or three rectilinear segments, and do not describe how the connections between conductors on the first and second surface are implemented.

A flex-PCB slotless winding for a BLDC machine is known from "B. Dehez, M. Markovic, Y. Perriard," Analysis and comparison of classical and flex-PCB slotless windings in BLDC motors," Electrical Machines and Systems (ICEMS), 2012 15th International Conference on, pp. 1-6, 21-24 Oct. 2012". This document, hereafter referenced as Reference 1, describes the general structure of a BLDC motor. An analytical expression of two parameters characterizing the winding, i.e. the torque constant and the electrical resistance are given. A comparison is made between a classic copper-wire winding, and a Flex-PCB winding having a simple shape (a conductor on one side of the PCB having three segments from the bottom of the PCB to the top of the PCB, forming either a skewed or a rhombic winding, as shown on FIG. 2 and FIG. 3 respectively) showing a potential 30% improvement in power density of the Flex-PCB winding over the classic copper-wire winding. However, no attempt is made at finding a design with optimal performance. No details are given as to how the conductors on the first surface are arranged with the conductors of the second surface so as to form coils or series of turns.

SUMMARY OF THE INVENTION

It is an object of the present invention to provide a winding for a rotating electrical machine having an improved performance and a method for designing such a winding.

The invention is defined by the independent claims. The dependent claims define advantageous embodiments.

According to a first aspect of the invention, there is provided winding for a rotating electrical machine, said machine comprising an inductor, an iron core, and an air gap in between, said winding comprising a flexible PCB having a plurality of conductors on a first surface and a plurality of conductors on a second surface of a substrate, said conductors being tracks printed on said PCB, a conductor of the first surface being connected through a via to a conductor of the second surface so as to form a turn, said PCB having an height and a length, such that when rolled up one or more times, in one or more layers, along the length, it is adapted for inserting into said air gap in an axial direction. According to the invention, a conductor has a shape extending from a bottom height of said flexible PCB to a top height of said PCB in an axial direction, along a continuous curve or a number n of rectilinear segments, n being larger than 3. The applicant has found, that, by giving the conductors a more complex shape, i.e. a continuous curve or a more than three rectilinear segments, unexpectedly good results could be obtained as to increase the performance of the electrical machine.

Preferably, the shape has a variable width such that the gap between a conductor and a neighboring conductor is equal to a predetermined constant along the length of said conductor. The predetermined constant distance is selected so as to achieve a good electrical insulation between two adjacent conductors located on the same side of the PCB. In other words, the conductors have a variable width.

When the shape of the conductors is extending along a number n of rectilinear segments, n is advantageously larger than 6 and smaller than or equal to 100. The applicant has found that 6 or more segments still improve the performance, but than no significant improvement can be obtained by using more than 100 segments.

According to a first preferred embodiment, the conductors have a line symmetric shape, the symmetry axis being a line along the length of the PCB, at mid-height of the PCB. This kind of winding is know in the art as a lap winding.

Preferably, a plurality of turns is connected in series so as to form a coil.

In a first connection mode, a conductor on the first surface of one turn is extended along its length and connected trough a via to a conductor on the second surface, having a corresponding extension, so as to form a connection between two successive turns of said coil, the two successive turns being at a distance in the length direction.

In a second connection mode, said plurality of turns is a number t of turns, conductors of the first surface being numbered from 1 to t in the length direction, conductors of the second surface being also numbered from 1 to t in the length direction, conductor i on the first surface being connected at the upper end of the PCB to conductor t-i of the second surface through a track extending along the length direction of the PCB, at decreasing heights, for i=1 to i=t-1; and conductor i on the first surface being connected at the lower end of the PCB to conductor t-i+1 of the second surface through a track extending along the length direction of the PCB, at increasing heights, for i=1 to i=t-1.

Conductors number t of first and second surface are connected to terminals. By using this second connection mode, the same torque as in the first connection mode is obtained. However, as the overall length of the conductors is shortened, the resistance is lower and the performance is improved.

According to a second preferred embodiment, said conductors have point symmetric shape, the reflection point being at mid-height of the PCB This kind of winding is know in the art as a wave winding.

Preferably, a plurality of turns are connected in series and forming a series of turns.

In a first connection mode, a plurality of adjacent series of turns are arranged at a distance in the length direction, a conductor on the first surface of one turn of one series is extended along its length and connected trough a via to a conductor of a successive series on the second surface, having a corresponding extension, so as to form a connection between two successive series, the two successive series being at a distance in the length direction.

In a second connection mode, a plurality of adjacent series of turns are arranged successively at a distance in the length direction, said plurality of series is a number t of series, adjacent conductors being numbered from 1 to t on both the first and second surface, and conductors 1 to t on the first surface are connected at the upper end of the PCB to conductors t to 1 respectively on the second surface through t tracks extending along the length direction of the PCB, at decreasing heights, and conductor 1 to t on the second surface being connected at the lower end of the PCB to conductor t to 1 of the first surface through t tracks extending along the length direction of the PCB, at increasing heights. For one serie of adjacent turns of the said plurality of series, conductors 1 to t-1 on the first surface are connected at the upper end of the PCB to conductors t-1 to 1 respectively on the second surface through t-1 tracks extending along the length direction of the PCB, at decreasing heights.

Conductors number t of first and second surface are connected to terminals. By using this second connection mode, the same torque as in the first connection mode is obtained. However, as the overall length of the conductors is shortened, the resistance is lower and the performance is improved.

The tracks of the second connection mode, in the first and in the second embodiment may advantageously be located on both the first and the second surface of the PCB. This will further reduce the resistance of the winding and improve the performance of the machine.

In this case, the tracks on both sides of the PCB may be connected through a plurality of vias.

The shape of the winding/conductors may advantageously be designed for optimizing the ratio $k_p$ of the torque constant $k_T$ over the square root of the phase resistance $R_{ph}$ of said winding.

$$k_p = \frac{k_T}{\sqrt{R_{ph}}}. \tag{1}$$

Other objective functions to be optimized may be selected: the efficiency, i.e. the ratio of power output to power input, or the power density, or the size of the electrical machine.

According to a second aspect of the invention, there is provided method for designing a winding for a rotating electrical machine, said machine comprising an inductor, an iron core, and an air gap in between, said winding comprising a flexible PCB having a plurality of conductors on a first surface and a plurality of conductors on a second surface, said conductors being tracks printed on said PCB, a conductor of the first surface being connected through a via to a conductor of the second surface so as to form a turn, said PCB having an height and a length, such that when rolled up one or more times, in one or more layers, along the length, it is adapted for inserting into said air gap in an axial direction. A conductor extends from a bottom height of the flexible PCB to a top height of the PCB in an axial direction, along a continuous curve or a number n of rectilinear segments, n being larger than 3, and has a variable width such that the gap between a conductor and a neighboring conductor is equal to a predetermined constant along the length of said conductor. According to the invention, the method comprises the steps of a) determining the torque constant $k_T$ of said rotating electrical machine in dependence of the geometric parameters of the shape of said conductor;

b) determining the phase resistance $R_{ph}$ of said winding in dependence of the geometric parameters of the shape of said conductor;

c) varying the shape parameters for optimizing the objective function $$k_p = \frac{k_T}{\sqrt{R_{ph}}}.$$

for obtaining the optimal shape of said conductors The other objective functions discussed above may also be selected.

The optimization may advantageously be performed using a genetic algorithm.

SHORT DESCRIPTION OF THE DRAWINGS

These and further aspects of the invention will be explained in greater detail by way of example and with reference to the accompanying drawings in which.

The drawings of the figures are neither drawn to scale nor proportioned. Generally, identical components are denoted by the same reference numerals in the figures.

DETAILED DESCRIPTION OF EMBODIMENTS OF THE INVENTION

Figure 1:
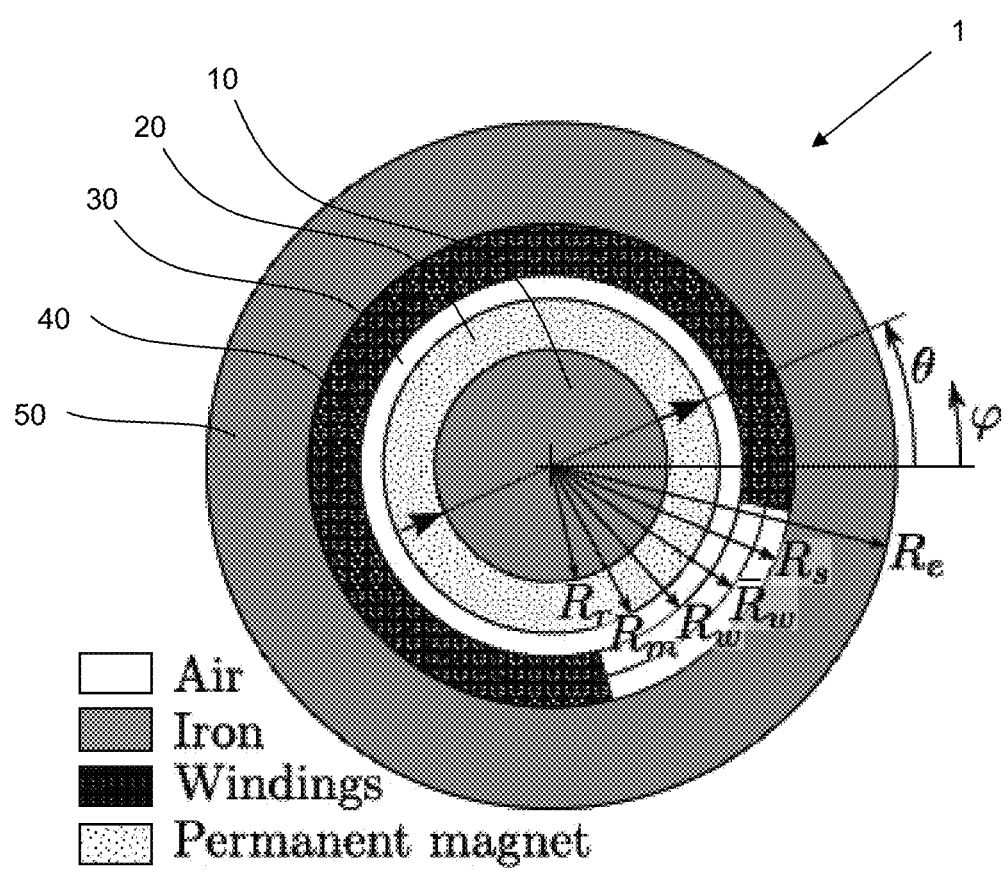
FIG. 1 is a schematic section along a plane perpendicular to the axis of a rotation electrical machine according to the invention.

FIG. 1 is a schematic section along a plane perpendicular to the axis of a rotation of a rotating electrical machine 1 according to the invention. Starting from the centre, there is a shaft 10 which may be made of iron or other ferromagnetic material, having radius $R_r$. On the shaft, there is an inductor, which may be a permanent magnet 20, which may be a 2-pole magnet, extending from radius $R_r$ up to radius $R_m$, producing a magnetic field in a direction perpendicular to the axis of rotation, whose magnetization is directed along the arrow at azimuthal angle θ. The inductor may also be a coil fed with a DC current. There is an air gap 30, extending from radius $R_r$ up to radius $R_m$, separating the rotor and the stator of the electrical machine. The winding according to the invention 40 is arranged between radius $R_w$ and $R_s$. An iron housing 50, extending from radius $R_s$ to radius $R_e$, which may be made of iron or other ferromagnetic material closes the magnetic circuit.

Figure 2A:
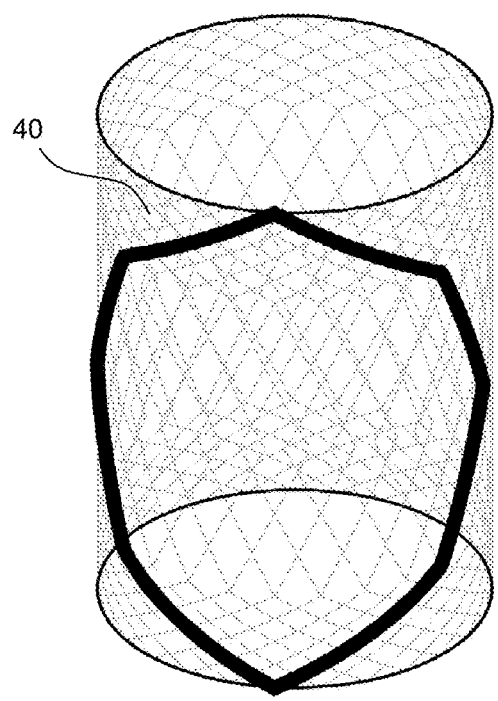
FIGS. 2a and 2b are a schematic representation of a PCB of a winding according to the invention, in a rolled up, and in a flat configuration, respectively, a turn having a lap configuration.
Figure 2B:
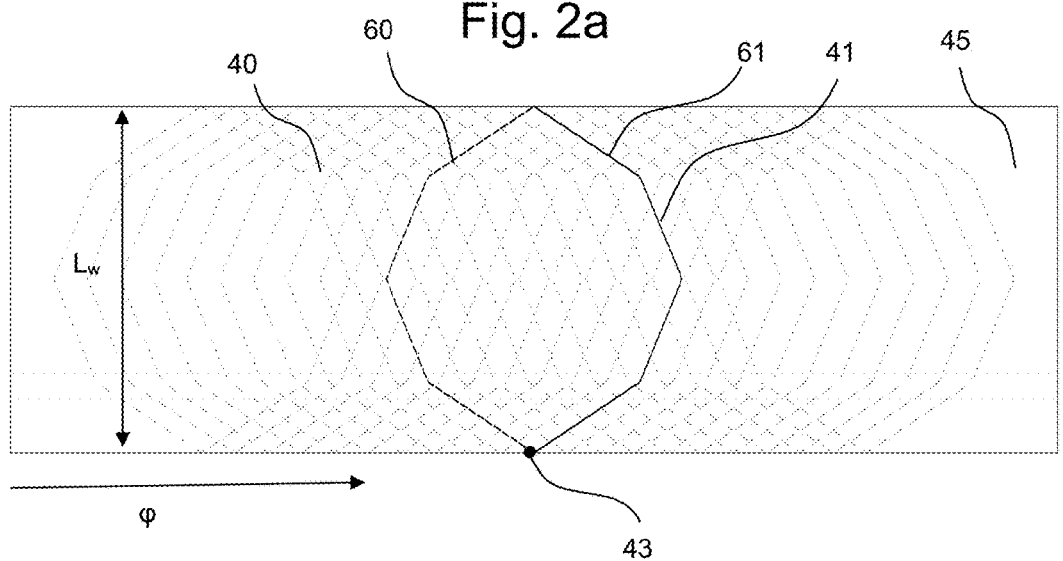

FIG. 2a is a schematic representation of a PCB 45 of a winding 40 according to a first embodiment of the invention, in a rolled up configuration. FIG. 2b shows the same PCB 45 in a flat configuration. The length φ corresponds to the azimuthal angle when the PCB is wound up. The height $L_w$ of the PCB extends along the axis of the electrical machine when the PCB is wound up and inserted into the air gap. A conductor 61, printed on one side (visible side) of the PCB 45, is represented as a continuous line. Another conductor 60, printed on the other side of the PCB 45 is represented as a dashed line. Conductors 60 and 61 have a line symmetry (or mirror symmetry) with respect to a line at mid-height of the PCB 45. Conductors 60 and 61 are mirror images of each other with respect to a vertical line. Conductors 60 and 61 may be connected through a via 43 at the bottom, and form a lap turn 41. Although the conductors 60,61 are represented on the drawings as extending upon the whole of the height $L_w$, the substrate of the PCB may extend a little so as to provide a margin. When a current flows in the turn 41, a magnetic field is generated perpendicular to the plane of the drawing. Each of the conductors 60 and 61 are comprised of n=4 rectilinear segments. The winding of FIG. 2b may be rolled up in one turn, the right-hand side of the turns overlapping the left hand-side of the turns. The PCB of FIG. 2b may also be extended a number of times in the length direction, and either rolled up said number of times, for forming a winding having a plurality of layers, or rolled up in one turn, for forming a winding having more poles and a larger diameter. Combinations of multi-layer, multiple poles windings may also be designed.

Figure 3A:
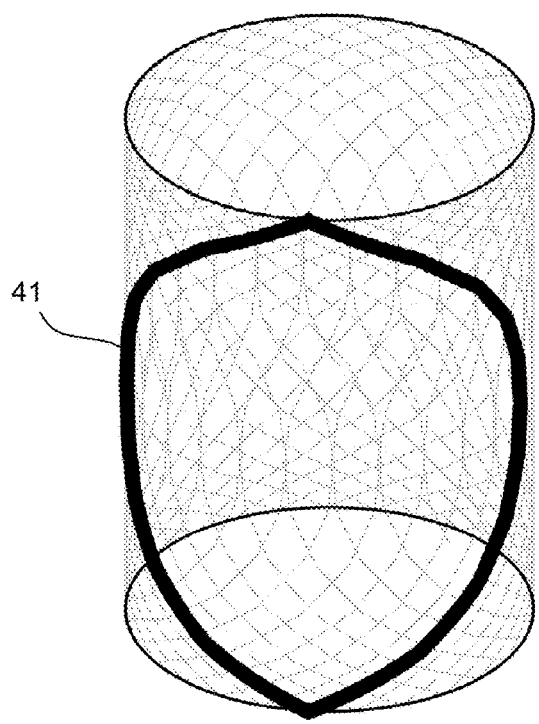
FIGS. 3a and 3b are a schematic representation of a PCB of a winding according to the invention, similar to FIGS. 2a and 2b, where the conductors have more rectilinear segments and therefore a still more improved shape.
Figure 3B:
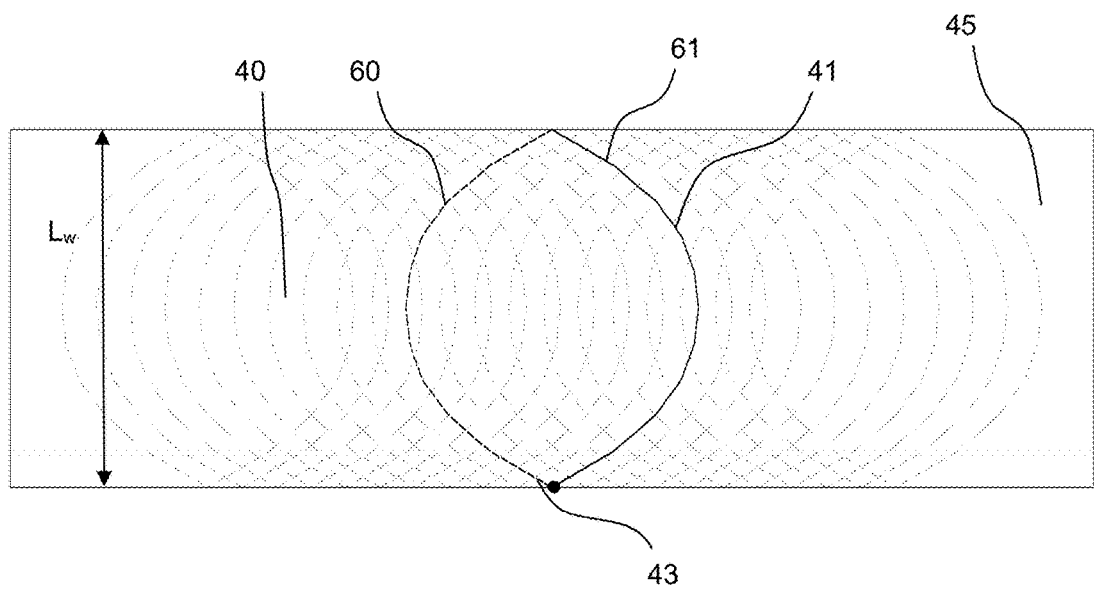
Figure 4A:
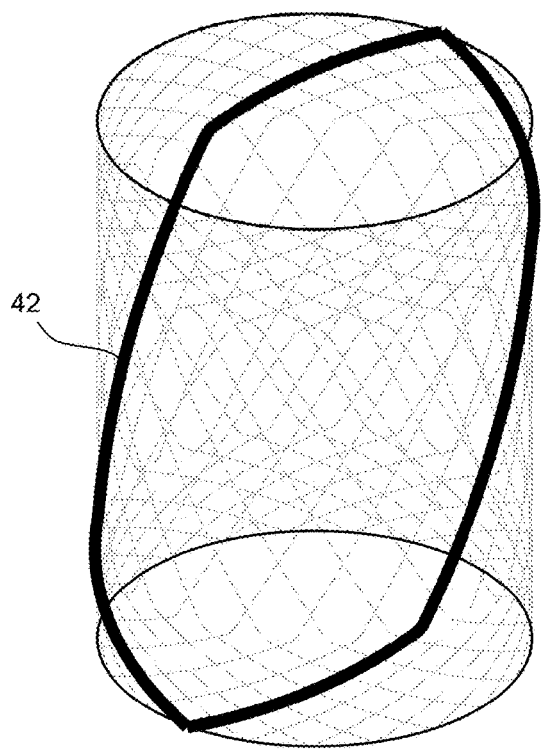
FIGS. 4a and 4b are a schematic representation of a PCB of a winding according to the invention, in a rolled up, and in a flat configuration, respectively, a turn having a wave configuration.
Figure 4B:
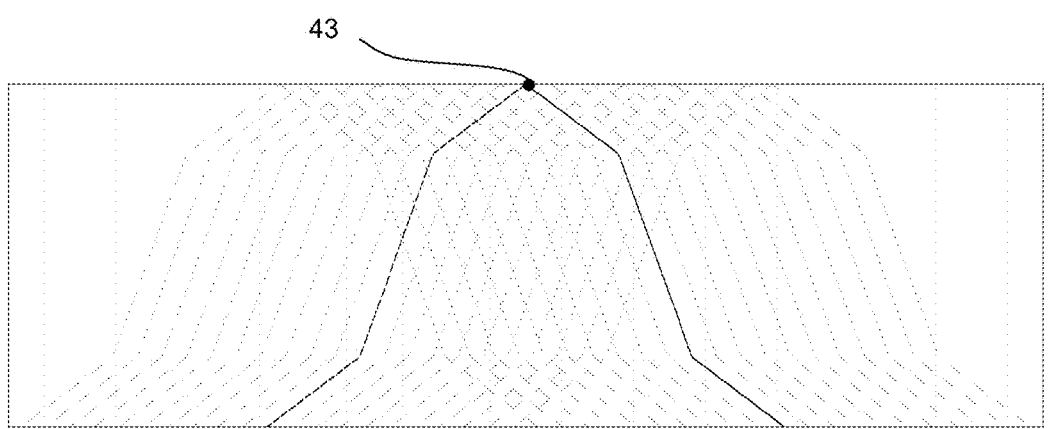
Figure 5A:
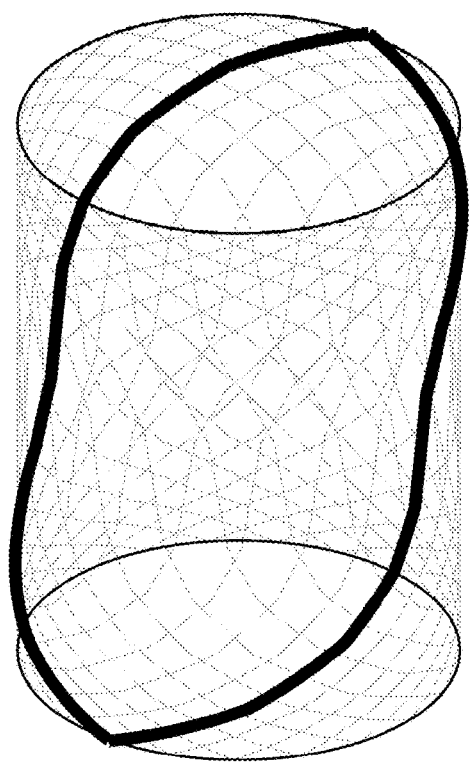
FIGS. 5a and 5b are a schematic representation of a PCB of a winding according to the invention, similar to FIGS. 4a and 4b, where the conductors have more rectilinear segments and therefore a still more improved shape.
Figure 5B:
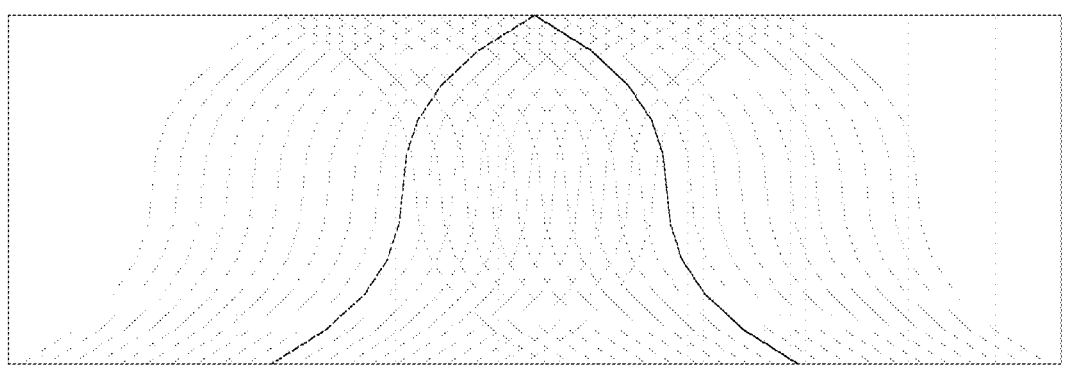

FIGS. 3a and 3b are similar to FIGS. 2a and 2b, but the number n of rectilinear segments is equal to 10. By increasing the number of rectilinear segments, a practically continuous curve can be obtained.

FIGS. 4a, 4b, 5a, and 5b are similar to FIGS. 2a, 2b, 3a, 3b, but the conductors 60, 61 have point symmetry with respect to a point at mid-length. Conductors 60 and 61 are also mirror images of each other with respect to a vertical line. Conductors 60 and 61 may be connected through a via 43, and form a wave turn 42.

Figure 6A:
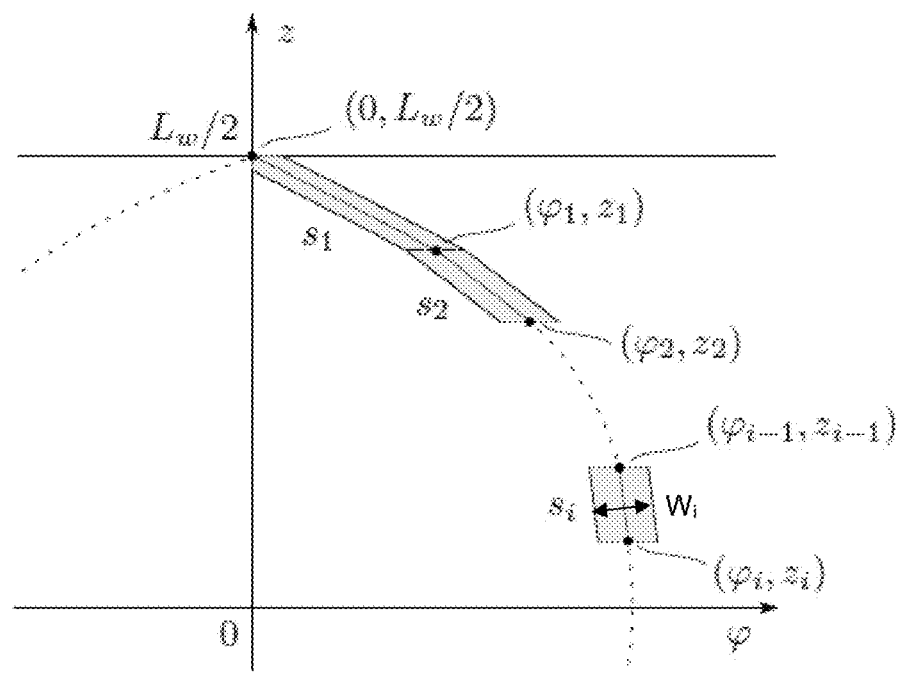
FIG. 6a represents the shape of a conductor of a winding according to the invention, having a number of rectilinear segments.

FIG. 6a represents the shape of a conductor of a winding according to the invention, having a number of rectilinear segments. The conductor 60 comprises a number of rectilinear segments, with edges joined as shown in FIG. 6a, in a continuous manner. By increasing the number n of segments, a continuous curve can be approached as close as desired. A segment $s_i$ is defined by the coordinates of its extremities, $(\varphi_{i-1}, Z_{i-1})$ and $(\varphi_i, Z_i)$. The width $W_i$ of a segment depends on its slope and on the distance between the conductor and a neighbouring conductor. By using the PCB technology, a winding of any shape may be designed. The applicant of the present invention has shown that, by carefully designing the shape of the conductor, a significant improvement in the performance of an electrical machine both in terms of power density and electrical efficiency can be obtained.

Figure 7A:
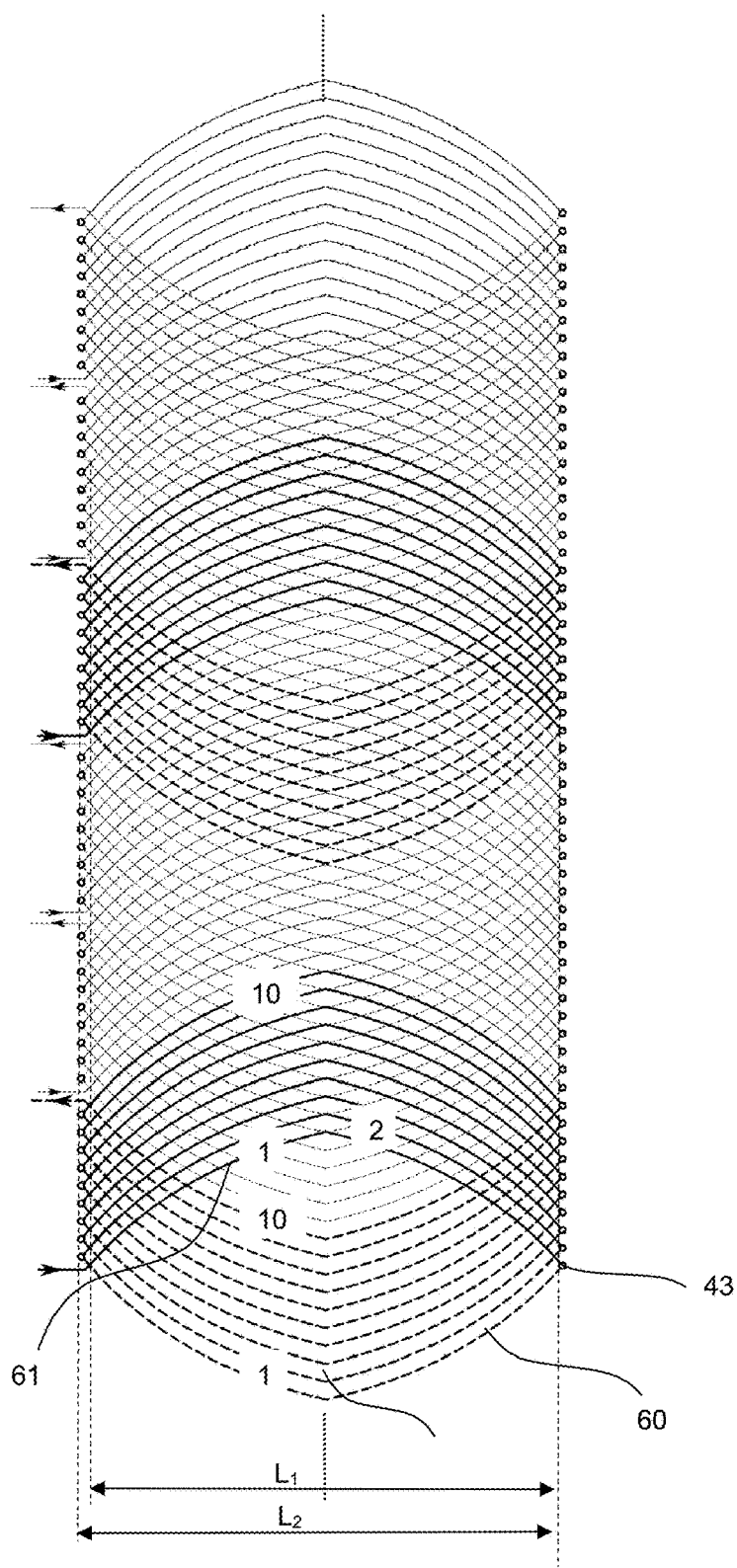
FIGS. 7a and 7b represent the winding of machines according to a first embodiment and second embodiment of the invention respectively, in a first mode of inter-turn connections.

FIG. 7a represents the winding for a rotating electrical machine according to a first embodiment of the invention and a first connection mode of turns. A plurality of successive turns are connected in series so as to form a coil. A first conductor 61 (number 1) on the front side of the PCB is linked at the top to a current entry terminal represented by a down arrow and at the bottom to the first conductor 60 (also number 1) on the back surface of the PCB through a via. The first conductor 60 then crosses first conductor 61 at an height indicated by $L_1$, and is extended up to an height indicated by $L_2$ so as to cross and connect through a via 43 with conductor number 2 of the front surface. These extensions ensure that the conductors of the second turn are located at a distance from the conductors of the first turn. The length of theses extensions are such that the distance between turns is equal to a predetermined constant. Conductors on the front surface and back surface are similarly connected in series up to the last (10$^{th}$) conductor 60 of the back surface, which arrives at a current exit terminal represented by an up arrow. Three phases are represented. When the right-hand end of the winding is rolled up one time so as to cover the left-hand end of the winding, a three-phase, two-poles winding is formed. The winding may also be extended, as suggested by the dotted lines, and rolled-up one or more times so as to form any number of phases, poles and layers.

Figure 7B:
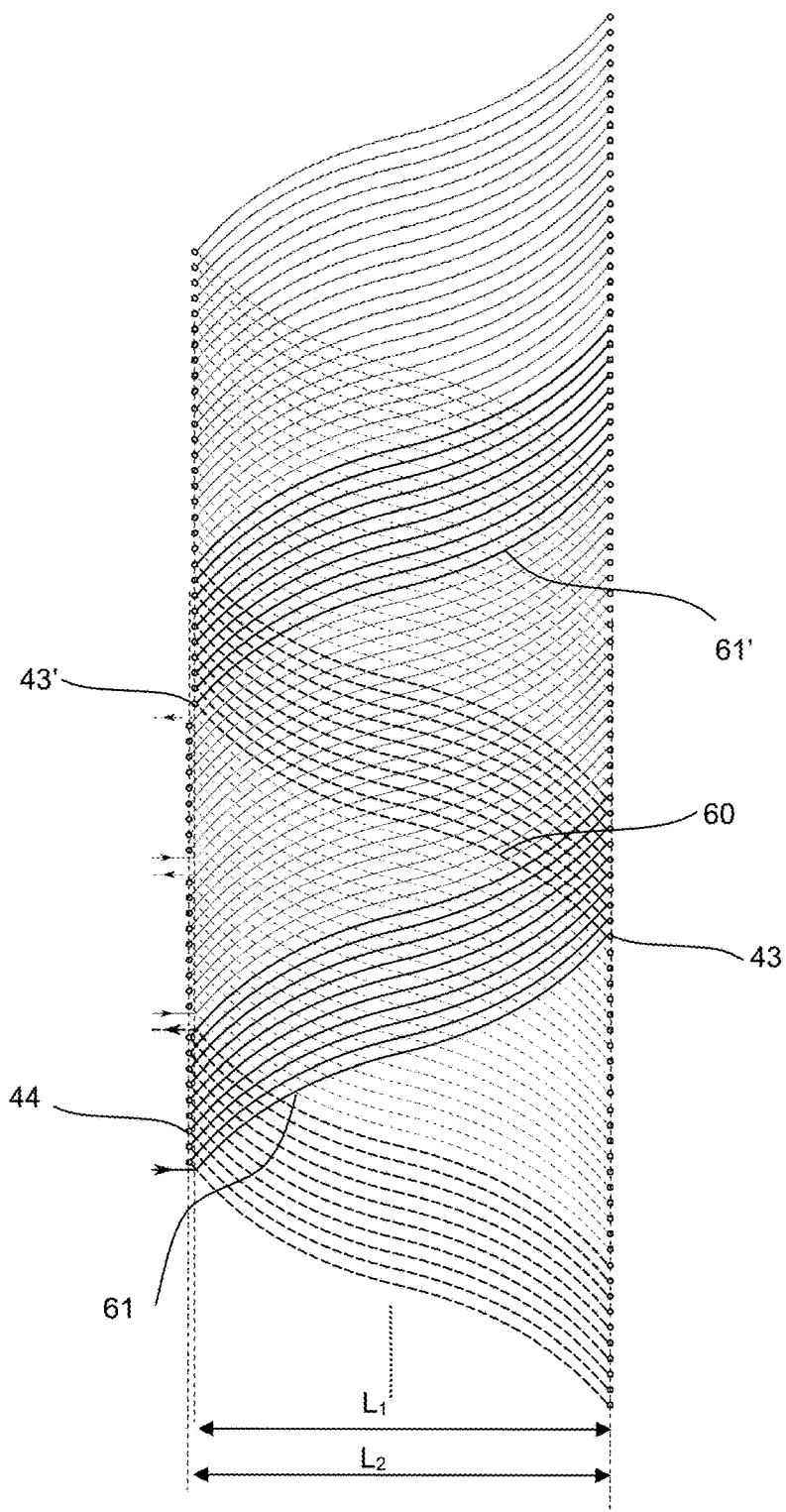

FIG. 7b represents the winding for a rotating electrical machine according to a second embodiment of the invention and a first connection mode of turns. Turns are connected in series so as to form a series of turns. Starting from the current entry terminal represented by a down arrow, a first conductor 61 is connected through a bottom via 43 to a first conductor 60 of the back surface and the again through a top via 43' at height $L_1$ to a first conductor 61' of the front surface. When the winding is rolled up, the bottom end of this conductor is connected to the bottom end of a first conductor 60, forming a first series of turns. Successive series of turns are connected, through vias 44, relying on extensions up to height $L_2$, so that successive series of turns are separated a predetermined distance in the length direction. The upper end of last (10$^{th}$) conductor 60 is connected to a current exit terminal represented by an up arrow. Vias 44 are at a height $L_2$ between the two current terminals and vias 43' are at a height $L_1$ elsewhere. When the right-hand end of the winding is rolled up one time so as to cover the left-hand end of the winding, a three-phase, two-poles winding is formed. The winding may also be extended, as suggested by the dotted lines, and rolled-up one or more times so as to form any number of phases, poles and layers.

Figure 8A:
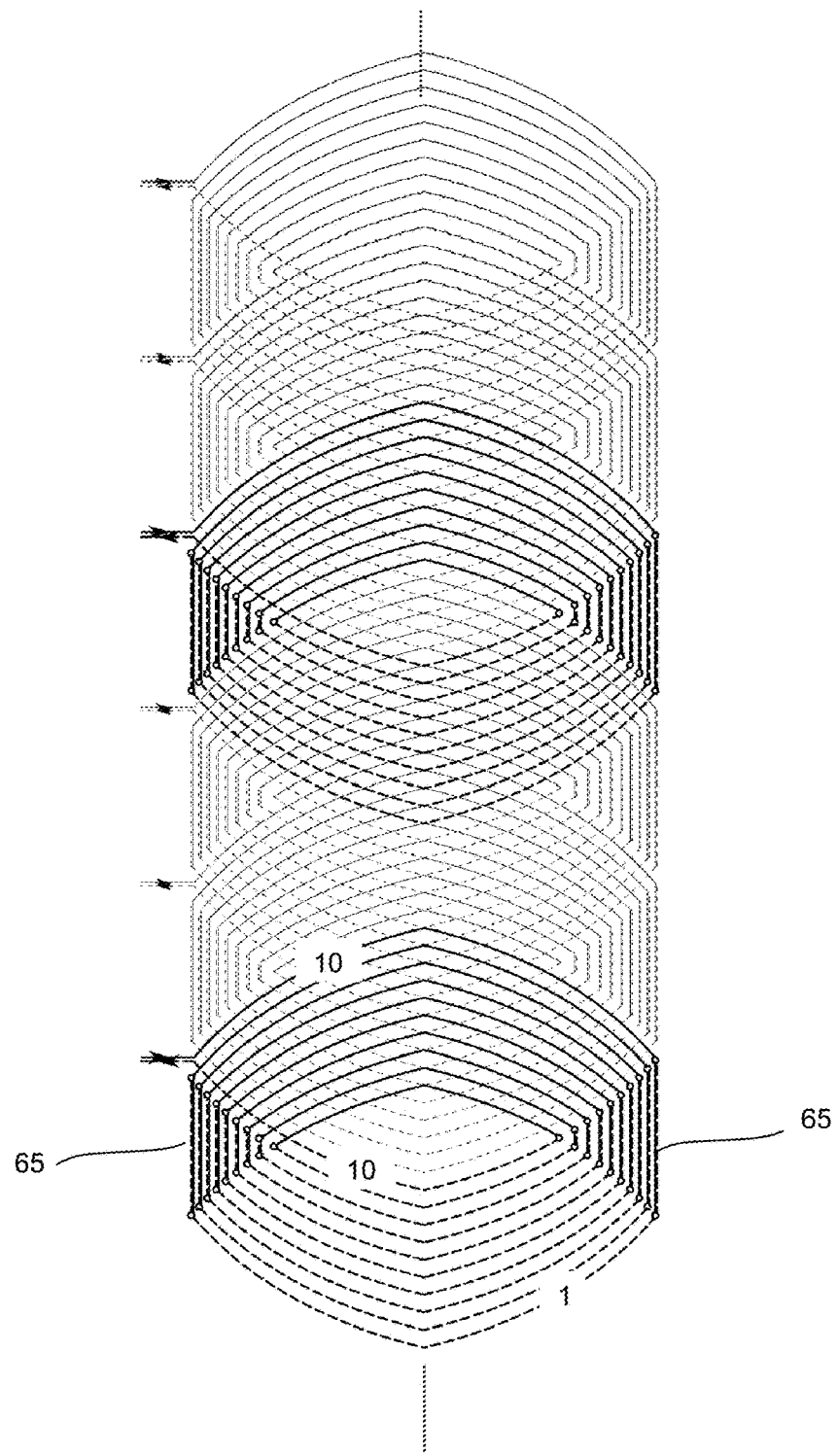
FIGS. 8a and 8b represent the winding of machines according to a first and second embodiment of the invention respectively in a second mode of inter-turn connections.

FIG. 8a represents the winding of a machine according to a first embodiment of the invention in a second mode of inter-turn connections. Starting from the current entry terminal represented by a down arrow, a last (10$^{th}$) conductor 61 on the front surface is connected to a horizontal track 65 at the bottom of the PCB, and extending up to the first conductor 60 of the back surface. Conductors, vias, and horizontal tracks succeed as represented on FIG. 8a in a spiral fashion up to last (10$^{th}$) conductor 60 of the back surface which is connected to a current exit terminal represented by an up arrow. Successive horizontal tracks 65 are shorter and shorter, and nearer to mid-horizontal line of the PCB. The last track, i.e. the connection between first conductor 61 of the front surface and last conductor (conductor number 10) of the back surface at the bottom and conductor number 9 at the top may be very short or even non-existing. As discussed with reference to FIG. 7a, when the right-hand end of the winding is rolled up one time so as to cover the left-hand end of the winding, a three-phase, two-poles winding is formed. Also, the winding may be extended, as suggested by the dotted lines, and rolled-up one or more times so as to form any number of phases, poles and layers.

Figure 8B:
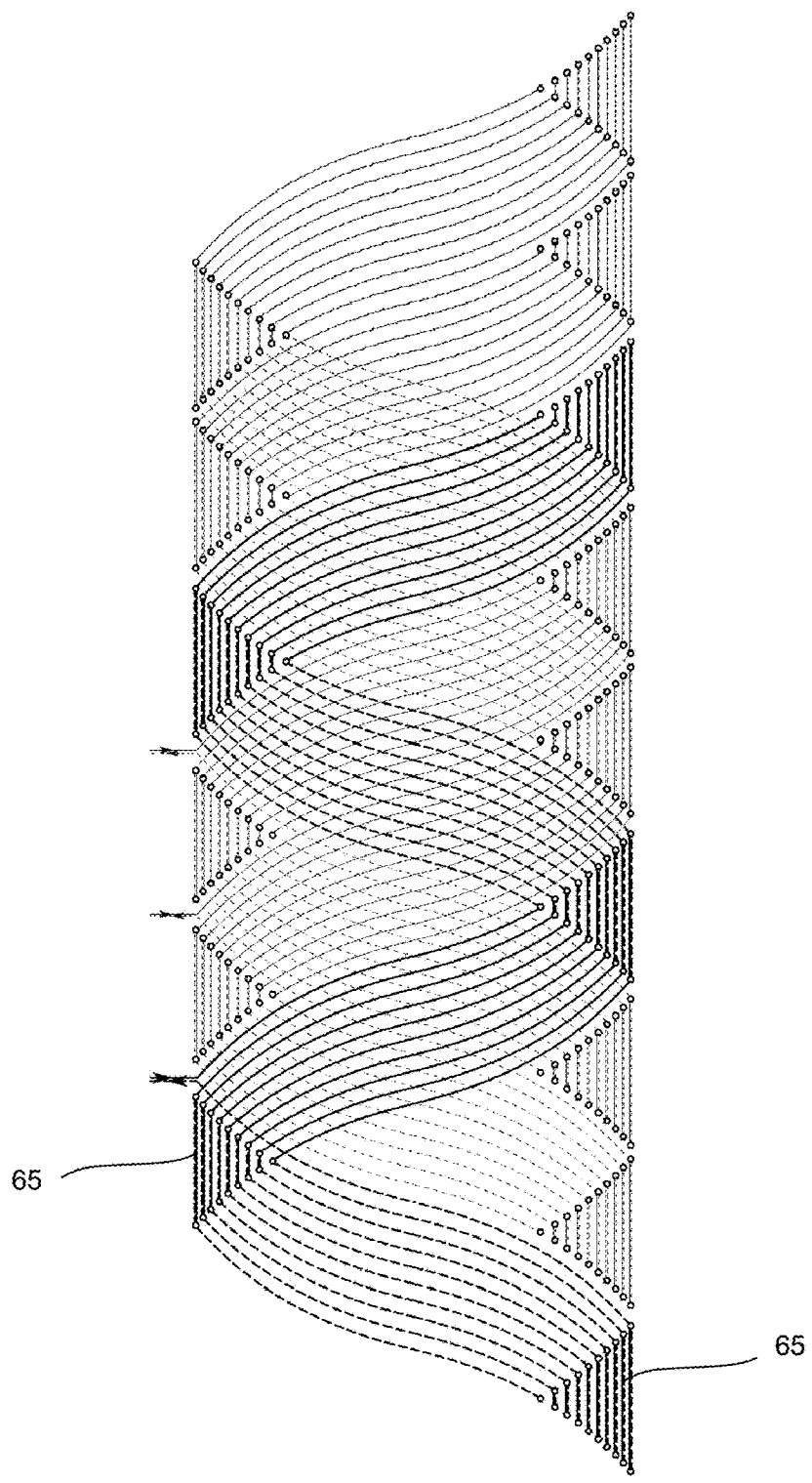

FIG. 8b represents the winding of a machine according to a second embodiment of the invention in a second mode of inter-turn connections. It is similar to FIG. 7b, and uses the inter-turn connection of FIG. 8a.

Figure 9A:
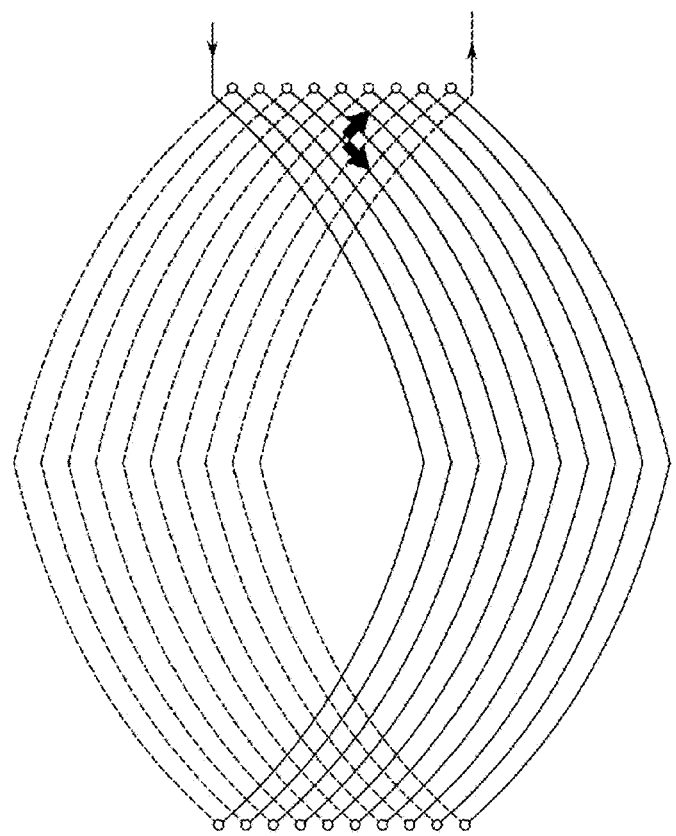
FIGS. 9a and 9b is a view and a detailed enlarged view of the inter-turn connections according to the first mode of inter-turn connection, in the first embodiment of the invention.
Figure 9B:
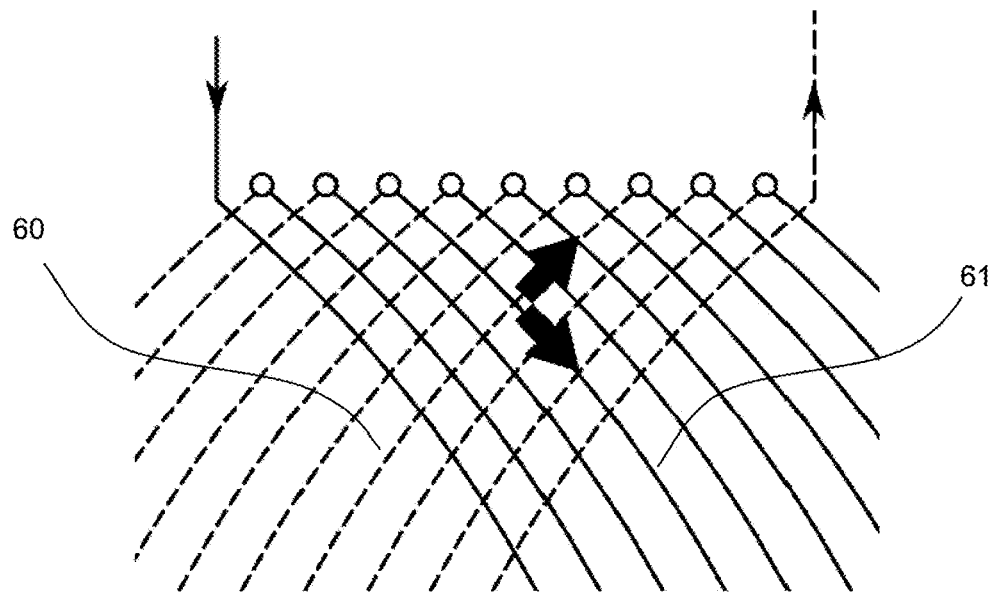
Figure 10A:
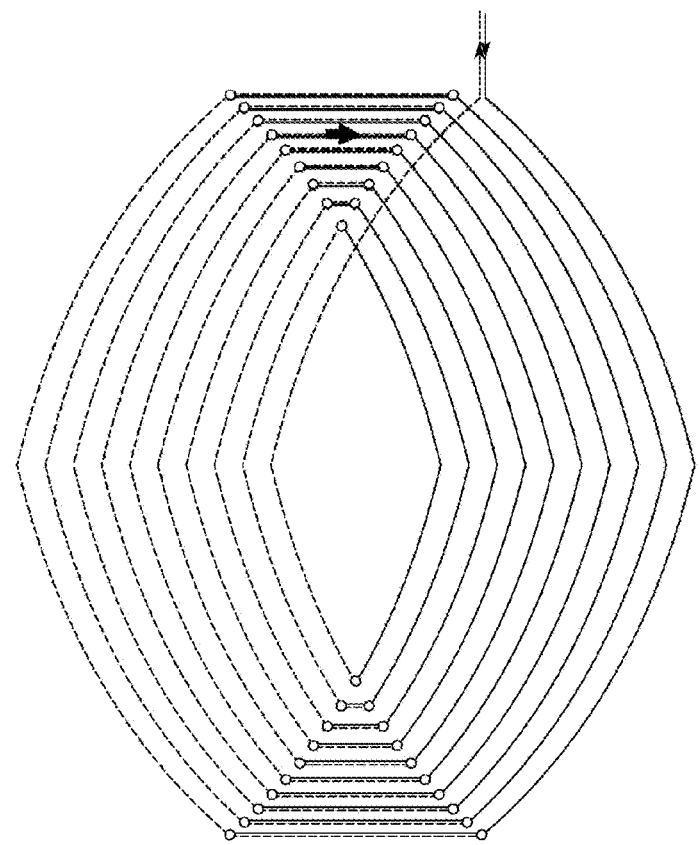
FIGS. 10a and 10b is a view and a detailed enlarged view of the inter-turn connections according to the second mode of inter-turn connection, in the first embodiment of the invention.
Figure 10B:
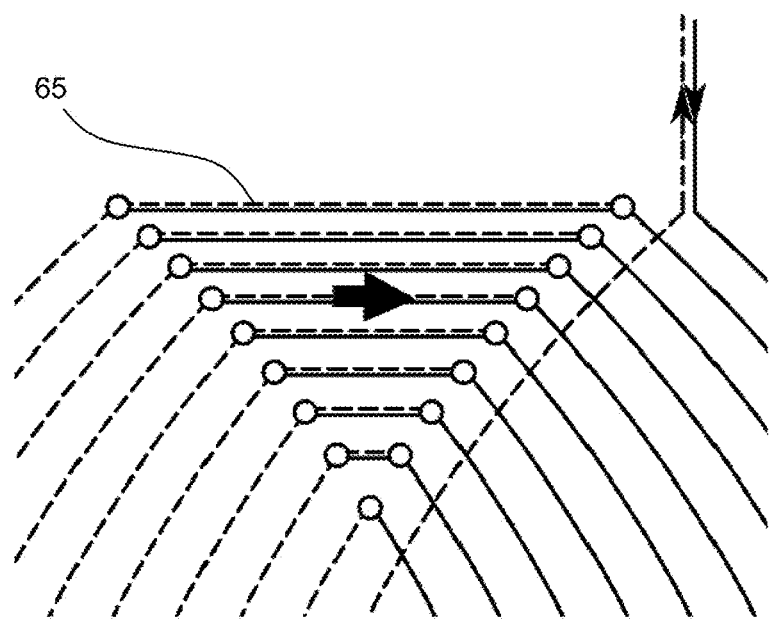

FIG. 9a is a view of a single coil of the winding of FIG. 7a. FIG. 9b is an enlarged view of the upper part of FIG. 9a. The two arrows represent the currents in corresponding portions of conductors 60 of the back and 61 of the front surface. As is well known by the man skilled in the art, only the axial component of currents will generate a torque in a motor. Therefore, in the nearly triangular regions where the conductors 60 of the back surface and 61 of the front surface overlap, the resulting torque will be nil (the vector resulting from the two arrows is in the horizontal direction, without axial component). This explains why the second mode of inter-turn connection, represented in FIGS. 10a and 10b represents no loss in torque when the electrical machine is a motor. For a same geometry and currents, the winding of FIG. 10a will produce the same torque as the winding of FIG. 9a. Compared to the winding of FIG. 9a, the winding of FIG. 10a has and shorter tracks, and therefore a reduced phase resistance $R_{ph}$. For the same reasons, when the electrical machine is a generator, the emf generated with the winding of FIG. 10a will be equivalent.

Two parameters determine essentially the performance of an electrical machine: the torque constant $k_T$, i.e. the ratio of torque to current, and the phase resistance $R_{ph}$, i.e. the overall resistance of the conductors. The relation of these parameters to the geometric, shape parameters of the winding have been given in reference 1, and more specifically for the torque constant at equation 16 for a wave winding (skewed winding) and at equation 17 for a lap winding (rhombic winding). Theses parameters depend also on other parameters, such as voltage, current, shape of field created by the permanent magnet. These parameters have not been varied in the optimization process. The phase resistance has been given at equation 29, with reference to equations 17 and 18 for a wave winding, and equation 21 and 22 for a lap winding.

The parameter $k_p$ of equation 1 is an image of the torque density of a motor of given size. Indeed, multiplying the numerator and denominator of the ratio by the current amplitude, the parameter $k_p$ appears to be nothing else than the ratio between the motor torque and the root square of the Joule losses. For the same dimensions, and therefore, pretty much, for the same capacity of evacuating the heat losses, the motor with the highest $k_p$ will then be able to develop the highest nominal torque.

A search has been performed for finding the geometric parameters of a conductor, as discussed in relation to FIG. 6a, giving the higher value of $k_p$.

For different values of the number n of rectilinear segments of the conductor, the following relative values of $k_p$ have been found:

| n | $k_p$ |
|---|---|
| 2 | 100% |
| 3 | 109.5% |
| 4 | 112% |
| 10 | 114% |

Figure 6B:
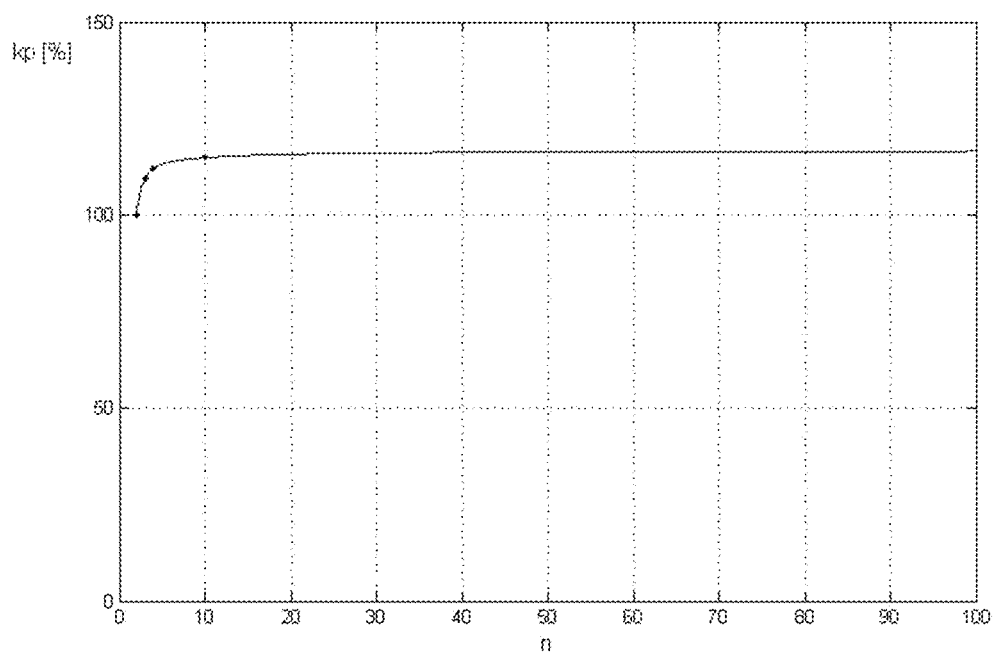
FIG. 6b represents the relative gain on the performance ratio $k_p$ in dependence of the number n of rectilinear segments of a conductor.

These results show a significant increase in performance of the improved shapes of the invention with respect to the know shapes. FIG. 6b shows the dependence of the performance ratio on n. A substantial increase is obtained with n=10. No significant improvement is observed for higher values of n.

The present invention has been described in terms of specific embodiments, which are illustrative of the invention and not to be construed as limiting. More generally, it will be appreciated by persons skilled in the art that the present invention is not limited by what has been particularly shown and/or described hereinabove. More specifically, the winding of the invention may be provided on the stator or the rotor of the electrical machine. The electrical machine may be a motor or a generator. The conductors on the first and second surfaces of a PCB described above may equivalently be on two or more layers of a multi-layer PCB. Although in the above examples, the successive turns of a coil or of a series of turns have been represented as having the same shape and width, the shape and width of each conductor of a coil or series of turns can be considered as parameters for optimizing further the performance of the machine.

Reference numerals in the claims do not limit their protective scope. Use of the verbs "to comprise", "to include", "to be composed of", or any other variant, as well as their respective conjugations, does not exclude the presence of elements other than those stated. Use of the article "a", "an" or "the" preceding an element does not exclude the presence of a plurality of such elements.

The invention may also be described as follows: the invention provides a winding for a rotating electrical machine comprising a flexible PCB having a plurality of conductors on a first surface and a plurality of conductors on a second surface, said conductors having a shape optimizing the performance of the machine, and a method for designing such a winding.

The invention claimed is:

1. A winding for a rotating electrical machine, said machine comprising an inductor, an iron core, and an air gap in between, said winding comprising a flexible printed circuit board (PCB) having a plurality of first conductors on a first surface and a plurality of second conductors on a second surface of a substrate, said first and second conductors being tracks printed on said PCB, a first conductor of the first surface being connected through a via to a second conductor of the second surface so as to form a turn, said PCB having an height and a length, such that when rolled up one or more times, in one or more layers, along the length, the PCB is adapted for inserting into said air gap in an axial direction, wherein at least one of said first conductor or said second conductor has a shape extending from a bottom height of said flexible PCB to a top height of said PCB in an axial direction, along a continuous curve or a number n of rectilinear segments, n being larger than 3, said at least one of said first conductors and said at least one of said second conductors not comprising (i) a current entry terminal and a current exit terminal, and (ii) a conducting connection located at a height above or below a crossing of said at least one of said first conductors and said at least one of said second conductors forming said turn, at the top or bottom of said PCB respectively.

2. The winding according to claim 1 wherein at least one of said first conductor or said second conductor has a variable width such that a gap between a conductor and a neighboring conductor is equal to a predetermined constant along the length of said conductor.

3. The winding according to claim 1 wherein at least one of said first conductor or said second conductor extends along a number n of rectilinear segments, n being larger than 6 and smaller than or equal to 100.

4. The winding according to any claim 1, wherein said first and second conductors have a line symmetric shape, the symmetry axis being a line along the length of the PCB, at mid-height of the PCB.

5. The winding according to claim 4, wherein a plurality of turns are connected in series so as to form a coil.

6. The winding according to claim 5, wherein a first conductor on the first surface of one turn is extended along its length and connected through a via to a second conductor on the second surface, having a corresponding extension, so as to form a connection between two successive turns of said coil, the two successive turns being at a distance in the length direction.

7. The winding according to claim 5, wherein said plurality of turns is a number t of turns, the plurality of first conductors of the first surface being numbered from 1 to t in the length direction, the plurality of second conductors of the second surface being also numbered from 1 to t in the length direction, and first conductor i on the first surface being connected at the upper end of the PCB to second conductor t−i of the second surface through a track extending along the length direction of the PCB, at decreasing heights, for i=1 to i=t−1; and first conductor i on the first surface being connected at the lower end of the PCB to second conductor t−i+1 of the second surface through a track extending along the length direction of the PCB, at increasing heights, for i=1 to i=t.

8. The winding according to claim 7 wherein said tracks extending along the length of the PCB are located on both the first and the second surface of the PCB.

9. The winding according to claim 8 wherein a plurality of vias are connecting said corresponding tracks on the first and second surface of the PCB.

10. The winding according to claim 1, wherein said conductors have point symmetric shape, the reflection point being at mid-height of the PCB.

11. The winding according to claim 10, wherein a plurality of turns are connected in series and forming a series of turns.

12. The winding according to claim 11, wherein a plurality of series of turns are arranged successively at a distance in the length direction, a first conductor on the first surface of one turn of one series is extended along its length and connected through a via to a second conductor of a successive series on the second surface, having a corresponding extension, so as to form a connection between two successive series, the two successive series being at a distance in the length direction.

13. The winding according to claim 11, wherein a plurality of series of turns are arranged successively at a distance in the length direction said plurality of series is a number t of series, adjacent first and second conductors being numbered from 1 to t on both the first and second surface, and first conductors 1 to t on the first surface are connected at the upper end of the PCB to second conductors t to 1 respectively on the second surface through t tracks extending along the length direction of the PCB, at decreasing heights, and second conductors 1 to t on the second surface being connected at the lower end of the PCB to first conductor t to 1 of the first surface through a track extending along the length direction of the PCB, at increasing heights, except for one of the said plurality of series where first conductors 1 to t−1 on the first surface are connected at the upper end of the PCB to second conductors t−1 to 1 respectively on the second surface through t−1 tracks extending along the length direction of the PCB, at decreasing heights, first and second conductors t of the first and second surface being connected to terminals.

14. The winding according to claim 13 wherein said tracks extending along the length of the PCB are located on both the first and the second surface of the PCB.

15. The winding according to claim 14 wherein a plurality of vias are connecting said corresponding tracks on the first and second surface of the PCB.

16. The winding according claim 1 wherein said shape is designed for optimizing the ratio $k_p$ of the torque constant $k_T$ over the square root of the phase resistance $R_{ph}$ of said winding, $$k_p = \frac{k_T}{\sqrt{R_{ph}}}.$$

17. A method for designing a winding according to claim 1, the method comprising:
   a) determining the torque constant $k_T$ of said rotating electrical machine in dependence of the geometric parameters of the shape of at least one of said first conductors or said second conductors;
   b) determining the phase resistance $R_{ph}$ of said winding in dependence of the geometric parameters of the shape of at least one of said first conductors or said second conductors; and
   c) varying the shape parameters for optimizing the objective function $$k_p = \frac{k_T}{\sqrt{R_{ph}}}.$$

for obtaining the optimal shape of at least one of said first conductors or said second conductors.

* * * * *